Aug. 25, 1953  R. D. GRAYSON  2,650,028
UNIVERSAL SAFETY TEMPERATURE CONTROL
Filed Nov. 4, 1950  3 Sheets-Sheet 1

Inventor:
Richard D. Grayson

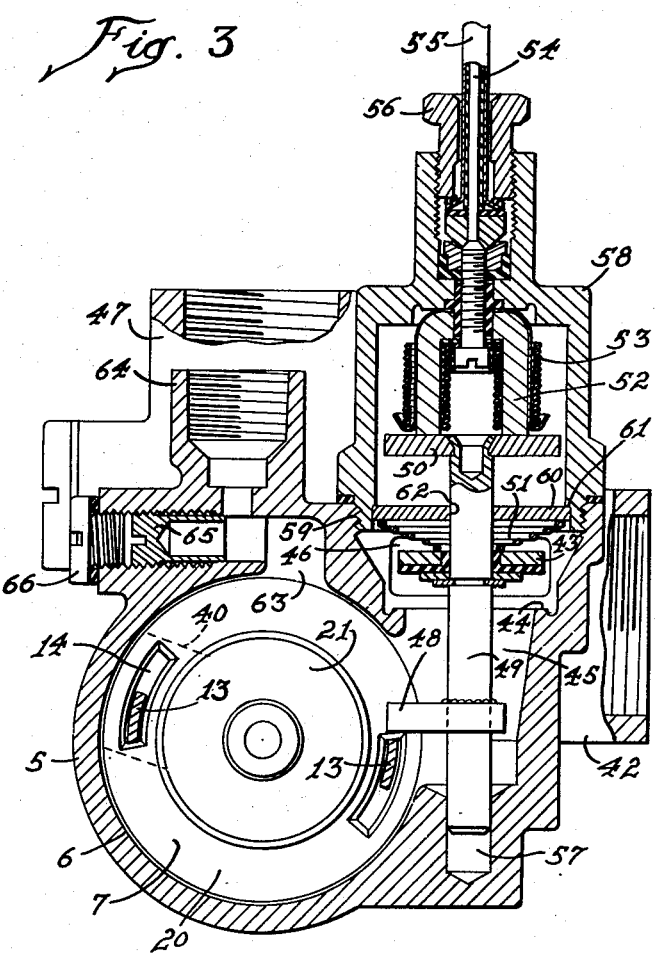

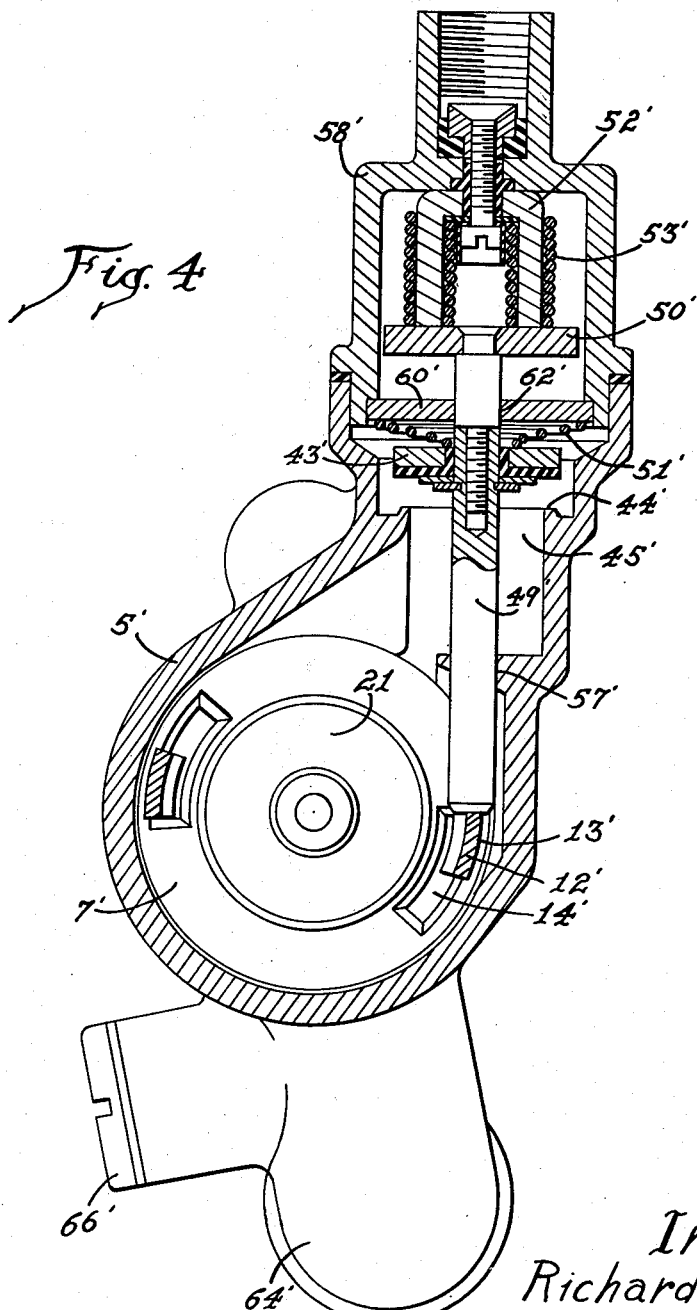

Patented Aug. 25, 1953

2,650,028

UNITED STATES PATENT OFFICE 2,650,028

UNIVERSAL SAFETY TEMPERATURE CONTROL

Richard D. Grayson, Monrovia, Calif., assignor, by mesne assignments, to General Controls Co., Glendale, Calif., a corporation of California Application November 4, 1950, Serial No. 194,155

19 Claims. (Cl. 236—21)

This invention relates to a universal automatic control unit for temperature control of automatic storage type water heaters and other gas burning heating appliances, and is more particularly concerned with the provision in a unitary device of a manually operable gas cock, automatic temperature control, and thermomagnetic safety pilot valve.

The principal object of my invention is to provide a safety temperature control incorporating a manual shut-off cock operable in such a way that when the plug is turned to shut off the gas the safety valve is also automatically closed, thus obviating the necessity for a separate pilot gascock or other pilot shut-off mechanism.

A salient feature of my construction is the provision of a recoil connection between the manually rotatable yoke and the shut-off plug, the yoke being the part which in the turning thereof to shut off the gas is arranged to operate the rod of the safety pilot valve to close it, the recoil connection insuring freedom of motion for the safety valve so that it will be free to close in the event that the dial is left in the "pilot" or reset position when the magnet happened to fail to hold the armature. If there were no such recoil connection and the dial was left in reset position, the closing spring of the safety valve would have to overcome the friction of the gascock. If the closing spring did not overcome this friction, gas could flow to the pilot whether or not the magnet was energized.

Another object is to provide an improved thermostatic gas cock, entirely aside from the safety pilot valve, embodying both a shut-off and thermostatic control in a single cock, as distinguished from providing the thermostatic valve in one body and the gas cock in a separate one.

The invention is illustrated in the accompanying drawings, in which—

Fig. 3 is a cross-section on the line 3—3 of Fig. 1, and

Fig. 4 is a section similar to Fig. 3 showing a modified or alternative construction.

Similar reference numerals are applied to corresponding parts in these four views.

Figure 1:
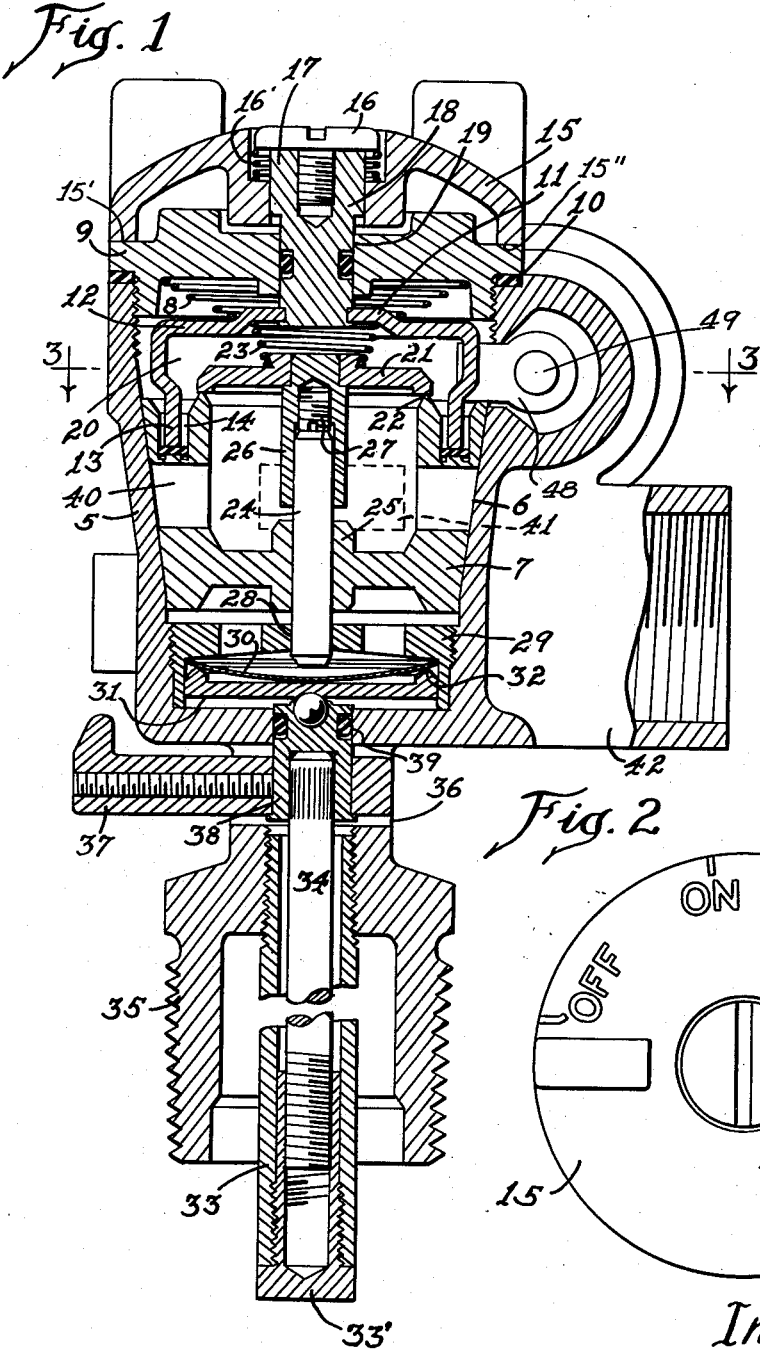
Fig. 1 is an enlarged longitudinal section through a universal safety temperature control unit made in accordance with my invention.
Figure 2:
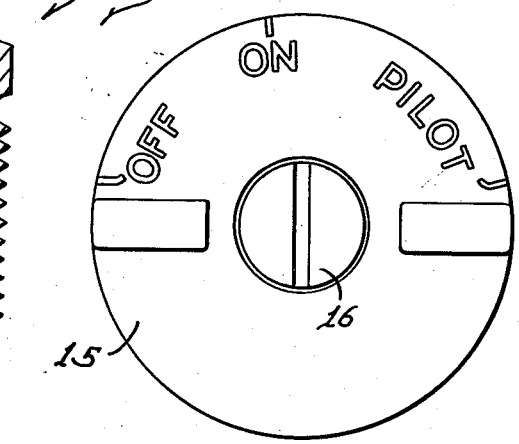
Fig. 2 is a face view of the manually operable dial for turning the rotary plug to "on" or "off" position and for setting or resetting the safety valve.

Referring first to Figs. 1 to 3, the reference numeral 5 designates the cast body or casing of the unit in which an open end bore 6 is provided, the intermediate portion of which is tapered to accommodate the tapered hollow plug 7. This plug is held seated under spring pressure by means of a conical compression spring 8, the large end of which is seated in a recess in the closure cap 9 threaded in the open end of bore 6, compressing a gasket ring 10 to prevent gas leakage. The small end of spring 8 encircles the embossed central portion 11 of the cross portion 12 of a U-shaped sheet metal yoke, the two arms 13 of which project inwardly toward the diametrically opposite side portions of the large end of plug 7 and are slidably engaged at their ends in arcuate grooves 14 provided in said plug. The grooves 14 are elongated enough to permit turning the yoke 12 through a predetermined angularity independently of the plug, for the setting or resetting of the pilot valve, as will soon appear, but the yoke 12 in any event constitutes the operating connection for the dial 15 for turning the plug 7 to "on" or "off" position, the dial 15 having a D-hole therein and being secured by means of a screw 16 to the D-shaped outer end portion 17 of a stem 18 that is suitably secured to the yoke 12 and extends through a center hole 19 in the cap 9, an O ring being provided in an annular groove in the stem to prevent gas leakage at that joint. The dial 15 is rotatable relative to an index on the body 5 or cap 9, and a coiled compression spring 16' caged in a recess in flat surface 15' on the rim of the dial 15 under the head of screw 16 holds the dial against the flat face 15'' of cap 9 under light spring pressure, enough frictionally to resist turning of the cap accidentally from an adjusted position, and permit resiliently and frictionally locking the dial releasably in the "on" position with a projection on one part entering a recess in the other. The space 20 between the cap 9 and the large end of plug 7 serves also as a valve chamber for the automatic temperature control valve 21. A knifeedged valve seat 22 is provided on the large end of the plug 7 within the span of the yoke 12, and the valve 21 is urged toward this seat by a conical compression spring 23 whose large end is seated in a recess defined on the inner side of the embossed portion 11 of yoke 12 and whose small end is seated on the central boss projecting from the back of valve 21. A push rod 24 is reciprocable freely in a guide 25 provided in the small end of plug 7 and has one end entered in a tubular stem 26 on the valve 21, an adjusting screw 27 being provided in the inner end portion of the stem to enable adjusting the relationship of the valve 21 to the rod 24 so as to provide wider opening of the valve and on the other hand, avoid a condition of the valve being held off its seat when it should be closed. The other end portion of rod 24 extends through another coaxial guide 28 provided in a mounting plug or bushing 29 that is threaded into the cylindrical inner end portion of the bore 6 and serves as a support for a snap action spring disk 30 and a guide for a cylindrical push member 31. The latter has a knife-edge projection 32 in engagement with the disk near the outer periphery thereof so that the disk is caused to snap over-center to open the valve 21 upon a predetermined movement of the push member, similarly as in Grayson patent 1,699,468 and as more specifically disclosed in the copending John H. Grayson application Serial No. 184,151, filed September 11, 1950, and Grayson Patent 2,524,788. The thermostat herein shown for causing the required movement of push member 31 in response to a predetermined change in temperature comprises the usual elements 33 and 34, interconnected at one end by a plug 33' the one element 34 being non-expanding or having a low coefficient of expansion, and the other element 33 being expansible or having a comparatively high coefficient of expansion, the movable element 34, for example, being a rod of Invar and the fixed element 33 being a brass or copper tube. The tube 33 is threaded into a plug 35 provided on an integral forked extension 36 of body 5; this plug being adapted to be threaded or otherwise suitably fixed in an adapter that is in turn suitably fixed in a hole in the wall of the tank of a gas-burning, storage type water heater. By virtue of this connection, it is evident that expansion and contraction of the tube 33 results in slight endwise movement of the rod 34. It will also be evident that a temperature adjustment is obtainable by turning rod 34 relative to tube 33, thereby threading said rod in or out relative to plug 33'. A lever 37 is attached to a cap 38 splined on the projecting end of rod 34 for manually adjusting the thermostat in the direction of "Hot" for hotter water or in the direction of "Cold" for cooler water, the pointer end of the lever 37 moving relative to suitable graduations on the outside of body 5. The rod 34, in its endwise movement, transmits movement to the cap 38 in an opening 39 in body 5 thereby moving push member 31 to cause snap-action of disk 30. The cap 38 has an annular groove in it receiving an O-ring to prevent gas leakage at that joint. A ball is seated in a recess in the end wall of the cap 38 and provides point contact between the parts to reduce friction drag in the adjustment of the thermostat and also in the snap operation of the disk 30 by the thermostat.

All universal automatic controls require, first, a manually operable valve for turning the gas "on" or "off," which valve is supplied by the plug 7 rotatable by dial 15 to bring one of its ports 40 into or out of register with outlet port 41 in the body, gas being continuously supplied to the valve chamber 20 through the gas inlet neck 42 on the body, which communicates with said chamber when the safety valve 43 is open. Such controls require, secondly, a thermostatic valve for automatically maintaining the selected temperature, this valve in the present instance being the snap action valve 21 operable in response to temperature change of thermostat 33—34. Finally, such controls require a safety valve, like valve 43, held open by the heat of a pilot light, so that should the pilot light be extinguished the safety valve will shut off all gas to the main burner, or, as in this case, all gas including that to the pilot burner. The safety valve cooperates with a valve seat 44 in a passage 45 in body 5, with which neck 42 communicates through a port 46. Turning dial 15 counterclockwise, as the dial appears in Fig. 2, to the "pilot" position, marked on the dial, an indicated in Fig. 2, turns plug 7 to the position illustrated in Fig. 1 wherein gas is shut off to the main burner (port 40 in the plug being out of register with port 41 in the body, with which a neck 47 connected to the main burner communicates). In this rotation of the plug 7 one of the prongs 13 of yoke 12 slidingly engages and moves a reset finger 48 fixed to and projecting laterally from a safety valve rod 49 on which are mounted the safety valve 43 and an armature 50, whereby to open the safety valve 43 against the resistance of its closing spring 51 and at the same time move the armature 50 to the attracted position relative to the horseshoe magnet 52 and hold it there until the magnet can be energized by current generated by the heat of the flame of the pilot burner after the same is lighted. It is in this reset position of dial 15 that the recoil connection afforded by the prongs 13 of yoke 12 working in the elongated grooves 14 plays an important part; this slip connection insures freedom of motion for the safety valve 43 so that it can turn dial 15 independently of plug 7 and accordingly will be free to close in the event that the dial 15 is left in reset or "pilot" position when the magnet 52 happened for any reason to fail to hold the armature 50 well enough to overcome action of closing spring 51. If there were no such connection—and yoke 12 could be turned back only if plug 7 turned with it—the closing spring 51 could not overcome the friction of plug 7 and the safety valve 43 would remain open when it ought to be closed. In other words, the energization of the magnet thermoelectrically would no longer be the determining factor. The thermoelectric generator is not shown but only the energizing coil 53 associated therewith and encircling the two prongs of the horseshoe magnet 52, the end portion of the insulated lead wire extending from the generator being indicated at 54 sheathed in a lead tube 55 attached as at 56 to body 5, the wire 54 being electrically connected with the insulated end of coil 53, whose other end is grounded. The rod 49 is guided at one end in a hole 57 provided in body 5 in one end of passage 45. A hollow cap 58 is threaded into the open end of passage 45, as at 59, and, in addition to providing an enclosing housing for the magnet 52 and armature 50, as well as a place for connecting the lead tube 55, provides a support for a plate 60 at 61 on which the large end of the conical compression spring 51 rests. Plate 60 has a center hole 62 through which rod 49 extends as a guide in coaxial relationship to guide 57. When safety valve 43 is opened, as above described by turning dial 15 to the "pilot" position, gas flows from inlet 42 into the outer end of valve chamber 20 and thence directly through a port 63 to the hollow neck 64 to which a small tube leading to the pilot burner is connected. This gas flow is independent of the open or closed position of valve 21 and, likewise, independent of the open or shut-off position of plug 7, because the latter is in the inner end of the valve chamber 20 and the gas from the inlet 42 enters the outer end of said chamber. Gas flow to the pilot burner may be regulated by threaded adjustment of a regulator valve 65, access to which may be had by removal of a screw plug 66. After the pilot burner is lighted and sufficient current is generated thereby thermoelectrically to energize magnet 52 so as to hold armature 50 and keep safety valve 43 open, the dial 15 can be turned clockwise, as the dial appears in Fig. 2, through 90° to "on" position, thus permitting gas to flow through plug 7 to the main burner under control only of valve 21. A suitable friction stop, such as a spring-pressed ball detent, may be provided in the rim portion of dial 15 or elsewhere to hold it releasably in the "on" position. Of course, when the water heater or other gas appliance in connection with which this control unit is used is to have the gas to it turned off, the dial 15 need only be turned clockwise, as seen in Fig. 2, so as to overcome the action of the friction stop or detent at the "on" position, this turning being through 90° and resulting in the complete shut-off of gas to both of the burners, due to the fact that plug 7 shuts off flow to the main burner and one prong 13 of yoke 12 engages and moves finger 48 to seat safety valve 43 against the attraction of magnet 52 but assisted by spring 51. On the other hand, if the pilot burner is accidentally extinguished, thereby discontinuing energization of coil 53 so that magnet 52 loses its attraction for armature 50, spring 51 automatically closes valve 43 and thereby eliminates the possibility of an explosion.

Referring to Fig. 4, a safety valve 43' of modified or alternative design is illustrated in which the rod 49', on which the valve 43' and armature 50' are mounted, is slidable in guides 57' and 62' leaving the inner end of the rod 49' exposed in substantially tangential relation to plug 7' for direct engagement and operation by one prong 13' of the yoke 12', whereby to open the safety valve 43' and set the armature 50' in attracted position relative to the magnet 52' when the dial 15 is turned to the "pilot" position, turning the plug 7' to shut off gas flow to the main burner until the pilot burner is lighted. There being no intermediate motion transmitting element or elements between the rod 49' and yoke 12', the number of parts required is reduced and the unit is accordingly made available in a more compact form and at lower cost, and the use of fewer moving parts makes for less likelihood of the unit failing to operate satisfactorily. With this design, however, a separate pilot gascock or shut-off mechanism is required, inasmuch as the yoke 12' functions only to open the safety valve 43', and hence if the plug 7' is turned to "off" position by clockwise rotation of yoke 12' it leaves the safety valve 43' open, thereby necessitating either a separate shut-off for the pilot or a separate closing means for the safety valve. Otherwise, the operation of this control is the same as the other.

It is believed the foregoing description conveys a good understanding of the objects and advantages of my invention. The appended claims have been drawn to cover all legitimate modifications and adaptations.

I claim:

1. In a heat control, a casing having an open end bore provided therein which includes a valve chamber in the open end and a tapered seat tapering inwardly from the valve chamber, a closure for the open end of the bore defining one wall of the valve chamber, said casing also having ports and associated passages provided therein, one of the ports communicating with the valve chamber, a tapered hollow shut-off plug having a close working fit in said tapered seat, said plug having a port provided in one side thereof arranged to communicate with another one of the casing ports in one position of rotation of the plug, said plug also being provided with an accurately formed flat valve seat on the large end normal to and in coaxial relationship with the axis of rotation of the plug, a valve push rod guided axially relative to said plug and extending toward the valve chamber, means for operating said push rod endwise in response to temperature change, a valve disk in the valve chamber carried on said push rod and adapted to have a close fit on said flat valve seat, a spring in said valve chamber urging said valve disk toward said seat, a yoke straddling said spring serving as an abutment therefor and connected with said plug to turn it, a spring bearing on said yoke so as to transmit seating pressure to the plug, the aforesaid closure for the open end of said bore serving as an abutment for the latter spring, and a manual control knob for turning said plug connected to a stem extending through a hole provided in said closure and attached to said yoke.

2. A heat control device as set forth in claim 1, wherein said knob is movable axially relative to its associated stem and said yoke, said device including spring means urging said knob inwardly into frictional contact with the closure independently of the yoke.

3. A heat control device as set forth in claim 1, wherein both the valve closing and plug seating springs are coiled compression springs, and wherein a middle portion of the yoke has an embossed spring seat portion on the outer side of which the end of one of said springs fits and on the inner side of which the end of the other of said springs fits so as to hold both springs against lateral displacement relative to said yoke.

4. A heat control device as set forth in claim 1, wherein the valve seat and valve disk are of small diameters in relation to the diameter of the large end of said plug, and wherein said yoke and the large end of said plug have portions on diametrically opposite sides of the valve and seat detachably connectable to provide an operating connection between said yoke and plug.

5. In a heat control, a casing having an open end bore provided therein which includes a valve chamber in the open end and a tapered seat tapering inwardly from the valve chamber, a closure for the open end of the bore defining one wall of the valve chamber, said casing also having ports and associated passages provided therein, one of the ports communicating with the valve chamber, a tapered hollow shut-off plug having a close working fit in said tapered seat, said plug having a port provided in one side thereof arranged to communicate with another one of the casing ports in one position of rotation of the plug, said plug also being provided with an accurately formed flat valve seat on the large end normal to and in coaxial relationship with the axis of rotation of the plug, a valve push rod guided axially relative to said plug and extending toward the valve chamber, an over-center snap-action spring disk mounted peripherally in a fixed, spaced, coaxial relationship to the small end of said plug and abutting the adjacent end of said push rod to transmit endwise movement thereto upon snap action of the disk, means to cause the disk to snap over center in response to a predetermined change in temperature, a valve disk in the valve chamber carried on said push rod and adapted to have a close fit on said flat valve seat, a spring in said valve chamber urging said valve disk toward said seat, a yoke straddling said spring serving as an abutment therefor and connected with said plug to turn it, a spring bearing on said yoke so as to transmit seating pressure to the plug, the aforesaid closure for the open end of said bore serving as an abutment for the latter spring, and a manual control knob for turning said plug connected to a stem extending through a hole provided in said closure and attached to said yoke.

6. In a heat control, a casing having an open end bore provided therein which includes a valve chamber in the open end and a tapered seat tapering inwardly from the valve chamber, a closure for the open end of the bore defining one wall of the valve chamber, said casing also having ports and associated passages provided therein, one of the ports communicating with the valve chamber, a tapered hollow shut-off plug having a close working fit in said tapered seat, said plug having a port provided in one side thereof arranged to communicate with another one of the casing ports in one position of rotation of the plug, said plug also being provided with an accurately formed flat valve seat on the large end normal to and in coaxial relationship with the axis of rotation of the plug, a bushing inserted in the inner end of said bore having a bore in it on that side away from the plug and toward the inner end of the casing bore, an over-center snap action spring disk mounted peripherally in said bushing bore, a plunger slidably guided in said bushing bore and engaging said disk so as to cause snap action thereof over center upon a predetermined axial movement of said plunger, means to cause such movement of said plunger in response to predetermined change in temperature, a valve push rod guided in said bushing and plug for axial movement relative to said plug and having its one end extending toward the valve chamber and having its other end arranged for engagement with the center of said snap action disk, a valve disk in the valve chamber carried on said push rod and adapted to have a close fit on said flat valve seat, a spring in said valve chamber urging said valve disk toward said seat, a yoke straddling said spring serving as an abutment therefor and connected with said plug to turn it, a spring bearing on said yoke so as to transmit seating pressure to the plug, the aforesaid closure for the open end of said bore serving as an abutment for the latter spring, and a manual control knob for turning said plug connected to a stem extending through a hole provided in said closure and attached to said yoke.

7. In a heat control, a casing having an open end bore provided therein which includes a valve chamber in the open end and a seat for a shut-off plug extending inwardly from the valve chamber, a closure for the open end of the bore defining one wall of the valve chamber, said casing also having ports and associated passages provided therein, one of the ports communicating with the valve chamber, a hollow shut-off plug having a close working fit in the seat in said bore, said plug having a port provided in one side thereof arranged to communicate with another one of the casing ports in one position of rotation of the plug, said plug also being provided with an accurately formed flat valve seat on the outer end normal to and in coaxial relationship with the axis of rotation of the plug, a valve push rod guided axially relative to said plug and extending toward the valve chamber, means for operating said push rod endwise in response to temperature change, a valve disk in the valve chamber carried on said push rod and adapted to have a close fit on said flat valve seat, a coiled compression spring in said valve chamber urging said valve disk toward said seat, a yoke straddling said spring serving as an abutment for one end thereof and connected with said plug to turn it, the aforesaid closure for the open end of said bore serving as an abutment for the other end of said spring, and a manual control knob for turning said plug connected to a stem extending through a hole provided in said closure and attached to said yoke.

8. A heat control device as set forth in claim 7, wherein said knob is movable axially relative to its associated stem and said yoke, said device including spring means urging said knob inwardly into frictional contact with the closure independently of the yoke.

9. A heat control device as set forth in claim 7, wherein the valve seat and valve disk are of small diameters in relation to the diameter of the outer end of said plug, and wherein said yoke and the large end of said plug have portions on diametrically opposite sides of the valve and seat detachably connectable to provide an operating connection between said yoke and plug.

10. In a fuel valve structure for controlling the flow of fuel to a main burner and a cooperating pilot burner, a casing having therein a fuel inlet passage in which is included a seat for a safety valve, a safety valve arranged to engage said seat and having spring means normally tending to close it and an armature for holding it open arranged to be attracted by a thermoelectrically energizable magnet operated in response to heat in the operation of the pilot burner, said casing having an outlet passage adapted to communicate with the pilot burner for delivery of fuel thereto whenever the safety valve is open, said casing also having a bore therein with which an outlet port communicates adapted for delivery of fuel to the main burner, a manually operable rotary hollow ported shut-off plug in said bore for controlling fuel delivery to the main burner port, said plug having a fuel inlet at one end and a valve seat coaxially arranged on the fuel inlet end, a temperature control valve arranged to engage said seat and having operating means connected therewith adapted to open and close said valve in response to temperature change, and a single manually operable means arranged to operate the safety valve and turn the shut-off plug to "on," or "off" position independently of the temperature responsive means.

11. A fuel valve structure as set forth in claim 10, wherein said last mentioned means includes a dial rotatable in either direction relative to an index indicating "on," "off" and "pilot" positions, said means being arranged to open the safety valve by rotation in one direction from "off" position and arranged to turn the plug to "on" position by rotation in the other direction, whereby to enable lighting the pilot burner before turning the main burner on.

12. A fuel valve structure as set forth in claim 10, wherein said last mentioned means includes a dial rotatable in either direction relative to an index indicating "on," "off" and "pilot" positions, said means being arranged to open the safety valve by rotation in one direction from "off" position and arranged to turn the plug to "on" position by rotation in the other direction, whereby to enable lighting the pilot burner before turning the main burner on, said last mentioned means having a recoil connection with said plug whereby to enable closing of the safety valve by spring action independently of any rotation of the plug, in the event the magnet is not energized sufficiently to hold the armature while the dial is still in the "pilot" position.

13. A fuel valve structure as set forth in claim 10, wherein said last mentioned means includes a dial rotatable in either direction relative to an index indicating "on," "off" and "pilot" positions, said means being arranged to open the safety valve by rotation in one direction from "off" position and arranged to turn the plug to "on" position by rotation in the other direction, whereby to enable lighting the pilot burner before turning the main burner on, said last mentioned means being arranged to close the safety valve in the same rotation of the dial when the plug is turned from "on" to "off" position.

14. A fuel valve structure as set forth in claim 10, wherein said last mentioned means includes a dial rotatable in either direction relative to an index indicating "on," "off" and "pilot" positions, said means being arranged to open the safety valve by rotation in one direction from "off" position and arranged to turn the plug to "on" position by rotation in the other direction, whereby to enable lighting the pilot burner before turning the main burner on, said last mentioned means having a recoil connection with said plug whereby to enable closing of the safety valve by spring action independently of any rotation of the plug, in the event the magnet is not energized sufficiently to hold the armature while the dial is still in the "pilot" position, said last mentioned means being arranged to close the safety valve in the same rotation of the dial when the plug is turned from "on" to "off" position.

15. In a fuel valve structure for controlling the flow of fuel to a main burner and a cooperating pilot burner, a casing having therein a fuel inlet passage in which is included a seat for a safety valve, a safety valve arranged to engage said seat and having spring means normally tending to close it and an armature for holding it open arranged to be attracted by a thermoelectrically energizable magnet operated in response to heat in the operation of the pilot burner, said casing having an outlet passage adapted to communicate with the pilot burner for delivery of fuel thereto whenever the safety valve is open, said casing also having a bore therein with which an outlet port communicates adapted for delivery of fuel to the main burner, a manually operable rotary hollow ported shut-off plug in said bore for controlling fuel delivery to the main burner port, said plug having a fuel inlet at one end and a valve seat coaxially arranged on the fuel inlet end, a temperature control valve arranged to engage said seat and having operating means connected therewith adapted to open and close said valve in response to temperature change, a yoke straddling the last named valve with sufficient clearance to permit opening movement of the valve and connected to the end of the plug to transmit rotary movement thereto, and a manually operable dial connected to said yoke to turn it, said yoke being arranged to operate the safety valve to fully opened position when the dial is turned in one direction to a predetermined position.

16. In a fuel valve structure for controlling the flow of fuel to a main burner and a cooperating pilot burner, a casing having therein a fuel inlet passage in which is included a seat for a safety valve, a safety valve arranged to engage said seat and having spring means normally tending to close it and an armature for holding it open arranged to be attracted by a thermoelectrically energizable magnet operated in response to heat in the operation of the pilot burner, said casing having an outlet passage adapted to communicate with the pilot burner for delivery of fuel thereto whenever the safety valve is open, said casing also having a bore therein with which an outlet port communicates adapted for delivery of fuel to the main burner, a manually operable rotary hollow ported shut-off plug in said bore for controlling fuel delivery to the main burner port, said plug having a fuel inlet at one end and a valve seat coaxially arranged on the fuel inlet end, a temperature control valve arranged to engage said seat and having operating means connected therewith adapted to open and close said valve in response to temperature change, a yoke straddling the last named valve with sufficient clearance to permit opening movement of the valve and connected to the end of the plug to transmit rotary movement thereto, a manually operable dial connected to said yoke to turn it, a rod attached to and reciprocable with the safety valve and guided for movement in a direction in transverse relationship to and spaced from the axis of rotation of said yoke and dial, and a lateral projection on said rod which is engaged by said yoke on one side to open said safety valve when the dial is turned in one direction, and is engaged by said yoke on the opposite side to close said safety valve when the dial is turned in the opposite direction.

17. A fuel valve structure as set forth in claim 15, wherein said yoke has two prongs slidable in elongated arcuate grooves provided therefor in the plug on diametrically opposite sides of the valve seat to provide a recoil connection enabling closing of the safety valve by spring action independently of any rotation of the plug, in the event the magnet is not energized sufficiently to hold the armature while the dial is still in the "pilot" position.

18. A fuel valve structure as set forth in claim 16, wherein said yoke has two prongs slidable in elongated arcuate grooves provided therefor in the plug on diametrically opposite sides of the valve seat to provide a recoil connection enabling closing of the safety valve by spring action independently of any rotation of the plug, in the event the magnet is not energized sufficiently to hold the armature while the dial is still in the "pilot" position.

19. In a fuel valve structure for controlling the flow of fuel to a main burner and a cooperating pilot burner, a casing having therein a fuel inlet passage including a safety valve seat and also a bore in spaced transverse relationship to said passage and communicating therewith on the fuel discharge side of said seat, said casing having an outlet port provided therein for the pilot burner communicating always with the discharge end of said passage, said casing also having an outlet port provided therein for the main burner communicating with said bore intermediate the ends thereof, a rotary hollow shut-off plug fitting closely in said bore having a port provided in one side thereof arranged to communicate with the last named port in one position of rotation of the plug, said plug also having a valve seat on the fuel inlet end thereof which communicates with the discharge end of the aforesaid passage, a safety valve arranged to engage the safety valve seat, a rod carrying said valve and guided for movement coaxially relative to said valve seat, spring means normally urging said valve and rod to closed position, an armature fixed to and moving with said rod, a fixed magnet arranged when energized to attract said armature holding the valve open, energizing means for said magnet dependent for its operation upon a flame on the pilot burner, a valve guided for engagement with the valve seat on said plug, means responsive to temperature change connected to open and close said latter valve, and a manually operable yoke connected to turn said plug to turn the fuel to the main burner on or off, said yoke turning in such relationship to said safety valve rod to move said safety valve rod in the opening direction when the yoke is turned in one direction to shut off fuel to the main burner while opening the safety valve to discharge fuel to the pilot burner.

RICHARD D. GRAYSON.

References Cited in the file of this patent

UNITED STATES PATENTS

| Number | Name | Date |
|---|---|---|
| 1,744,465 | Grayson | Jan. 21, 1930 |
| 2,198,896 | Wetzel | Apr. 20, 1940 |
| 2,318,823 | Wantz | May 11, 1943 |
| 2,328,642 | Green | Sept. 7, 1943 |